(12) United States Patent
Carragher et al.

(10) Patent No.: US 11,401,776 B2
(45) Date of Patent: Aug. 2, 2022

(54) DOWNHOLE OPERATIONS RELATING TO OPEN HOLE GRAVEL PACKS AND TOOLS FOR USE THEREIN

(71) Applicant: BiSN Tec Ltd, Cheshire (GB)

(72) Inventors: Paul Carragher, Birchwood (GB); Lance Underwood, Houston, TX (US); Sylvain Bedouet, Houston, TX (US)

(73) Assignee: BiSN Tec Ltd., Warrington (GB)

( * ) Notice: Subject to any disclaimer, the term of this patent is extended or adjusted under 35 U.S.C. 154(b) by 0 days.

(21) Appl. No.: 16/326,183

(22) PCT Filed: Aug. 21, 2017

(86) PCT No.: PCT/GB2017/052470
§ 371 (c)(1),
(2) Date: Feb. 15, 2019

(87) PCT Pub. No.: WO2018/033760
PCT Pub. Date: Feb. 22, 2018

(65) Prior Publication Data
US 2019/0186230 A1    Jun. 20, 2019

(30) Foreign Application Priority Data

Aug. 19, 2016 (GB) .................................... 1614227
May 24, 2017 (WO) ................ PCT/GB2017/051458

(51) Int. Cl.
*E21B 33/13* (2006.01)
*E21B 36/00* (2006.01)
*E21B 33/134* (2006.01)

(52) U.S. Cl.
CPC ............ *E21B 33/13* (2013.01); *E21B 33/134* (2013.01); *E21B 36/00* (2013.01); *E21B 36/008* (2013.01)

(58) Field of Classification Search
CPC ....... E21B 33/13; E21B 33/138; E21B 36/008
See application file for complete search history.

(56) References Cited

U.S. PATENT DOCUMENTS 1,534,229 A    4/1925   Livergood
2,076,308 A    4/1937   Wells
(Continued)

FOREIGN PATENT DOCUMENTS

CA    2592556    6/2007
EP    1 339 943    9/2003
(Continued)

OTHER PUBLICATIONS

Dec. 2, 2020, EPO, Examination Report EP 17 754 778.3.
Feb. 2, 2018, WIPO, Search Report PCT/GB2017/052470.
Feb. 2, 2018, WIPO, Opinion PCT/GB2017/052470.

*Primary Examiner* — D. Andrews (57) ABSTRACT

The present invention provides a method of sealing a region of a sand screen of an Open Hole Gravel Pack without the need to perforate the sand screen and a tool for use in such. The tool being a eutectic/bismuth based alloy well plugging/sealing tool (1) having a tubular heater body (2) with an internal cavity (4) capable of receiving a chemical heat source (105). The tool is provided with a quantity of eutectic/bismuth based alloy (3) around an outer surface of the heater body (2) such that it can be heated by the chemical heat source (105). In addition the tool (1) has an insulating sleeve (7) provided around an outer surface of the alloy (3), wherein the sleeve (7) is configured to provide a focused egress for the alloy (3) as it is melted by the chemical heat source (105).

15 Claims, 4 Drawing Sheets

(56) References Cited

U.S. PATENT DOCUMENTS

| | | | |
|---|---|---|---|
| 2,686,689 A | 8/1954 | Douglas | |
| 2,789,004 A | 4/1957 | Forster | |
| 2,822,876 A | 2/1958 | Murrow | |
| 3,119,451 A | 1/1964 | Hall | |
| 3,170,516 A | 2/1965 | Corley | |
| 3,208,530 A * | 9/1965 | Thomas | E21B 33/1204 166/60 |
| 3,871,315 A | 3/1975 | Anderson | |
| 4,134,452 A | 1/1979 | Kingelin | |
| 4,423,783 A | 1/1984 | Haag | |
| 4,488,747 A | 12/1984 | Austin | |
| 4,523,640 A | 6/1985 | Wilson | |
| 4,696,343 A | 9/1987 | Anderson | |
| 5,052,489 A | 10/1991 | Carisella | |
| 5,507,345 A * | 4/1996 | Wehunt, Jr. | E21B 33/124 166/285 |
| 5,564,861 A | 10/1996 | Khudenko | |
| 5,653,287 A * | 8/1997 | Wilson | E21B 36/003 166/302 |
| 6,102,120 A | 8/2000 | Chen | |
| 6,454,001 B1 | 9/2002 | Thompson | |
| 6,474,414 B1 | 11/2002 | Gonzalez | |
| 6,664,522 B2 | 12/2003 | Spencer | |
| 6,828,531 B2 | 12/2004 | Spencer | |
| 6,923,263 B2 | 8/2005 | Edin | |
| 7,152,657 B2 | 12/2006 | Bosma | |
| 7,290,609 B2 | 11/2007 | Wardlaw | |
| 2002/0162596 A1 | 4/2002 | Simpson | |
| 2002/0056553 A1 | 5/2002 | Duhon | |
| 2003/0132224 A1 | 7/2003 | Spencer | |
| 2004/0261994 A1 | 12/2004 | Nguyen | |
| 2005/0109511 A1 | 5/2005 | Spencer | |
| 2006/0144591 A1* | 7/2006 | Gonzalez | E21B 33/13 166/277 |
| 2007/0051514 A1 | 3/2007 | La Rovere | |
| 2010/0006289 A1 | 1/2010 | Spencer | |
| 2010/0126735 A1 | 5/2010 | Allison | |
| 2010/0263876 A1 | 10/2010 | Frazier | |
| 2011/0132223 A1 | 6/2011 | Streibich | |
| 2011/0146519 A1 | 6/2011 | Han | |
| 2011/0174484 A1 | 7/2011 | Wright | |
| 2011/0214855 A1 | 9/2011 | Hart | |
| 2012/0199351 A1 | 8/2012 | Roberston | |
| 2012/0298359 A1 | 11/2012 | Eden | |
| 2012/0312561 A1 | 12/2012 | Hallundaek | |
| 2013/0087335 A1 | 4/2013 | Carraher | |
| 2013/0192833 A1 | 8/2013 | Gano | |
| 2014/0318782 A1 | 10/2014 | Bourque | |
| 2015/0211326 A1 | 7/2015 | Lowry | |
| 2015/0211327 A1 | 7/2015 | Lowry | |
| 2015/0211328 A1 | 7/2015 | Lowry | |
| 2015/0345248 A1 | 12/2015 | Carragher | |
| 2015/0368542 A1 | 12/2015 | Carragher | |
| 2016/0145962 A1 | 5/2016 | Carragher | |
| 2016/0319633 A1 | 11/2016 | Cooper | |
| 2017/0030162 A1 | 2/2017 | Carragher | |
| 2017/0089168 A1 | 3/2017 | Carragher | |
| 2017/0226819 A1 | 8/2017 | Carragher | |
| 2017/0234093 A1 | 8/2017 | Carragher | |
| 2017/0234100 A1 | 8/2017 | Carragher | |
| 2017/0306717 A1 | 10/2017 | Carragher | |
| 2019/0085659 A1 | 3/2019 | Carragher | |
| 2019/0144355 A1 | 5/2019 | Carragher | |
| 2019/0186230 A1 | 6/2019 | Carragher | |
| 2020/0173250 A1 | 6/2020 | Carragher | |
| 2020/0248526 A1 | 8/2020 | Carragher | |
| 2020/0332620 A1 | 10/2020 | Carragher | |
| 2020/0347696 A1 | 11/2020 | Carragher | |

FOREIGN PATENT DOCUMENTS

| | | |
|---|---|---|
| EP | 1 933 004 | 6/2008 |
| GB | 2016063 | 9/1979 |
| GB | 2 164 886 | 4/1986 |
| GB | 2 529 275 | 2/2016 |
| WO | WO 2011/151171 | 12/2011 |
| WO | WO 2013/066340 | 5/2013 |
| WO | WO 2016/024122 | 2/2016 |
| WO | WO 2016/024123 | 2/2016 |

* cited by examiner

DOWNHOLE OPERATIONS RELATING TO OPEN HOLE GRAVEL PACKS AND TOOLS FOR USE THEREIN

FIELD OF THE INVENTION

The present invention relates to well tools for use in downhole operations, such as oil and gas well work. More specifically the invention relates to tools capable of setting eutectic/bismuth based alloy seals and plugs in Open Hole Gravel Packs (OHGP).

BACKGROUND OF THE INVENTION

Open hole completions and in particular Open Hole Gravel Packs (OHGP) present a different set of challenges to cased-hole completions when it comes to oil/gas well repair, abandonment and completion operations.

Unlike cased-hole completions open hole completions generally offer less control of the fluids exposed to the wellbore. This can present problems when, over time, the production quality of particular zones diminishes due to a reduction in the desirable products coming for the zones.

Typically, the volume of fluids exiting a particular zone can stay roughly the same but the ratio of oil to water is reduced. This increase in the water entering the production tubing can greatly increase the operational costs of the wellbore (i.e. due to water extraction requirements) while at the same time reducing the total amount of viable product being extracted.

In cases where the production value of a particular zone of an open hole completion falls remedial action can be taken to isolation the zone so that the rest of the wellbore can continue to produce from the rest of the zones. One approach used in these remedial operations is to use cement/resin to plug or seal the particular zone of the open hole completion that is failing.

Open Hole Gravel Packs (OHGP) employ screens to hold back the surrounding proppant (e.g. sand) whilst allowing the oil/gas to be extracted from the oil/gas reservoir. However, these 'sand screens' present a problem when it comes to sealing off zones within this environment because it is not possible to pump resin, epoxy or cement through the screens to seal of the annulus.

In order to facilitate the passage of the cement/resin past the 'sand screens' and into the surrounding formation so that the zone can be sealed off, the 'sand screens' must first be perforated. This perforation process involves a risk causing collateral damage that can potentially destroy the completion.

Even if the 'sand screens' are successfully perforated to allow the cement/resin to flow into the surrounding formation, the extent to which the plug formed extends into the surrounding formation can be limited. In cases where the reach of the plugs is limited the fluids of the zone are able to simply flow around the edges of the plug, thus providing only limited remedial value.

SUMMARY OF THE INVENTION

In view of the difficulties faced when deploying plugs and seals within open hole completions, such as OHGPs, to close off or isolate failing or depleted zones, the present invention provides a method of sealing a region of a sand screen of an Open Hole Gravel Pack without the need to perforate the sand screen, wherein the method involves: delivering a eutectic/bismuth based alloy to a target region adjacent the sand screen; heating the alloy so that it melts and flows through the sand screen; and allowing the alloy to cool and form a seal.

The viscosity of the molten eutectic/bismuth based alloy is such that it can flow out through the screens and reach the surrounding sand, for example. This eliminates the need to perforate the screen, which can potentially destroy the completion.

Preferably the method of sealing a region of the sand screen is carried out using a eutectic/bismuth based alloy well plugging/sealing tool, said tool comprising: a tubular heater body with an internal cavity capable of receiving a chemical heat source; a quantity of eutectic/bismuth based alloy provided in thermal communication with the heater body around an outer surface of the heater body; and an insulating sleeve provided around an outer surface of the alloy; and wherein the sleeve is configured to provide a focused egress for the alloy as it is melted by the chemical heat source.

Providing the insulating sleeve helps to 'super heat' the alloy that is held between the heater body and the sleeve. Super heating the molten alloy enables the alloy to penetrate further into the surrounding environment when it eventually leaves the tool. This is considered particularly beneficial when forming seals in the open hole completions of wells located in sand pack formations.

Preferably the sleeve may not extend the full length of the heater body and/or the alloy.

Extending the sleeve along only a portion of the alloy serves to control the location on the well tool from which the molten alloy is released. That is to say, the alloy is trapped between the heater and the sleeve (i.e. in the annular space) until the sleeve ends—at which point the molten alloy is free to escape into the surrounding environment.

This focusing of the alloy is considered particularly advantageous when setting plugs in oil and gas wells with open hole completions that employ sand screens (i.e. Open Hole Gravel Packs).

The inventors have discovered in open hole completions however, that in cases where molten alloy is allowed to flow freely from the well tool, the alloy will essentially drip through the screen along the whole length of the well tool. This leads to the creation of multiple small moulds of alloy on the outside of the screen rather than a complete seal.

In order to address this problem it has been found that providing a sleeve which does not extend the full length of the well tool ensures that the location at which the alloy is deployed from the tool is more focused.

As a result a single seal is produced at the desired location (i.e. adjacent to the point where the overlap between the sleeve and the alloy/heater ends) instead of lots of smaller alloy mounds along the length of the screen.

In addition, it has also been discovered that having the heater extend beyond the sleeve provides the further benefit of heating the area where the seal is to be formed, which helps the alloy to stay molten for longer and thus penetrate further through the surrounding sand screen.

Although this approach to focusing the molten alloy is considered highly effective it is also envisioned that, in arrangements where the sleeve extends along the entire length of the well tool, the sleeve may be provided with weakened regions that perish before the main body of the sleeve and provide clearly defined conduits for the molten alloy to escape. In this way the sleeve is once again configured to provide a focused outlet for the alloy as it is melted by the chemical heat source.

Although the disclosure primarily refers to eutectic and bismuth based alloys, it is envisaged that other alloys might suitably be employed in certain conditions. In particular, alloys referred to as low melt alloys' or low melting point alloys' (LMPA) are considered suitable. These alloys are defined as having a melting point of 385° C. or below. The chemical heater system that is the subject of this invention is capable of melting such alloys. In view of this, the present disclosure should be read as contemplating the use of not only eutectic and bismuth based alloys, but also LMPAs in the described tools and methods.

Providing the sleeve with insulating properties is highly beneficial because it serves to reduce heat loss from the tool of the present invention. This means that any heat generated by the tool is used more efficiently, which in turn means that less chemical heat source material is needed to achieve the required heat output.

This more efficient use of the chemical heat source material means that less space needs to be given over to the cavity in the heater body, which in turn enables the overall diameter of the well plugging/sealing tool to be decreased without necessarily having to also increase the length of the tool.

Providing an outer sleeve with insulating properties also helps to prevent heat being 'sucked' away from the tool as a consequence of the environmental conditions within the target region. By way of an example, it is envisioned that insulating the tool in this way prevents heat loss as a result of cross-flow within the well.

Cross-flow occurs when fluids move down a pressure gradient within the well and in doing so create a flow of fluids past the target region which can remove heat from the region over time.

As a result, the outer sleeve also allows the tool to be constructed with a reduced outer diameter that is better suited for deployment down deviated wells, which open hole completions often can be.

Preferably the tubular heater body, the alloy and the sleeve may be arranged co-axially to one another.

Advantageously the tubular heater body and the sleeve define an annular space within which at least a portion of the alloy is enclosed. In this way a shielded region is provided to house at least a portion of the alloy.

It is appreciated that providing the alloy within a shielded region away from the harsh environment at the target region within a well can provide a number of benefits; details of which will be provided hereinafter.

Further preferably the annular space may further contain a spacer element with a greater structural strength than the alloy. In this way the spacer element, which can be formed for example from steel, provides structural protection to the softer alloy held within the annular space. This additional strength is particularly important during any machine handling of the well plugging/sealing tool prior to and during its insertion within a well opening.

It will be appreciated that providing the tool with a region of greater structural strength enables the well tool to be gripped in that region by the machinery that is typically used to deliver well tools to the well opening. In the absence of the strengthened region it is possible that the softer alloy could be vulnerable to being crushed, along with the outer sleeve, when the tool is gripped by the handling machinery.

It is also appreciated that providing the strengthened region enables the thickness of the sleeve, which is on the outside of the tool, to be reduced. This helps further reduce the overall diameter of the tool.

Additionally the sleeve may be formed from a material which has structural strength. Providing a sleeve with increased structural strength helps to protect the well tool as it is deployed down-hole. This is considered particularly important in the case of highly deviated wells because it is not uncommon for well tools to be dragged across substantially horizontal regions, which can subject the well tool to stresses.

In view of the above benefits the sleeve is preferably formed from one or more of the following: fibre glass, thin steel, carbon fibre, and synthetic fibre of a high tensile strength (e.g. Kevlar®).

The above identified materials are considered suitable for the sleeve because they are capable of providing insulating properties and/or structural strength/durability even when provided in relatively low thickness. By way of example it has been discovered that a few millimetres of fibreglass bonded to the well plug using epoxy resin has an insulation value that is 200 times that of steel. Once again this helps keep the overall diameter of the well tool to a minimum.

It is envisaged that the material may be used in combination to achieve both insulating and structural benefits. In addition, it is envisaged that composite materials capable of providing both benefits may also be employed to form the sleeve.

Advantageously the sleeve may further be provided with wear pads that extend radially outwards from the sleeve. In this way the well tool can be better protected against the stresses imparted on the well tool as it is dragged across substantially horizontal regions of wells, for example. As the person skilled in the art will be well aware of suitable types of wear pads they will not be discussed in further detail here.

Additionally or alternatively in those embodiments of the present invention where the sleeve does not cover all the alloy, the exposed alloy may be provided with an outer diameter that is less than the rest of the tool. By setting the exposed alloy back from the rest of the tool it is envisaged that the softer alloy will be better protected against bumps and collisions that may damage the exposed alloy as the tool is run down a well.

Preferably the well tool may further comprise connection means for attaching the well plugging/sealing tool to a well deployment tool. Further preferably the connection means may secure the heater body and the sleeve together.

Additionally or alternatively, the heater body may be connected to the sleeve via the spacer element provided in the annular space between the heater body and the sleeve.

Preferably the well tool may further comprise resilient basing means located within the cavity of the tubular heater body that are configured to impart pressure on any chemical heat source received with the cavity.

In this way any chemical heat source material housed within the cavity is urged together so as to eliminate any gaps, which could affect the passage of the chemical reaction from the ignition means along the length of the heater.

In some situations the size of a depleted zone within an open hole completion is too large to isolate using the alloy plugging approach detailed above, not least due to the amount of alloy required. On these occasions it is appreciated that a better approach would be to by-pass the depleted zone so that products can continue to be extracted from operational zones located below the depleted zone.

The present invention utilises the eutectic/bismuth based alloy well plugging/sealing tool employed in the method of sealing a region of a sand screen of an Open Hole Gravel Pack to instead deploy a by-pass conduit within the wellbore.

The present invention also provides a method of deploying a by-pass conduit adjacent a sand screen within an Open Hole Gravel Pack, said method comprising: deploying the eutectic/bismuth based alloy well plugging/sealing tool of the present invention; operating the tool to melt the alloy and form a seal that extends into the adjacent sand screen; removing the chemical heat source from the cavity of the tubular heater body such that the tubular heater body can serve as a by-pass conduit.

The present invention further provides a straddle tool, said straddle tool comprises a length of conduit, such as a pipe, that has the eutectic/bismuth based alloy well plugging/sealing tool of the present invention located at both of its ends.

It is envisaged that the straddle tool of the present invention can be used, for example, to seal off large areas of sand screen by securing the pipe across a region of sand screen by using the well plugging/sealing tool to form seals both upstream and downstream of the area of sand screen being isolated. It will be appreciated that the formation of the seals serves to anchor the pipe in position.

In addition to sealing of a region of sand screen within an Open Hole Gravel Pack, the straddle can also be used to hang other components off (e.g. new length of production tubing).

BRIEF DESCRIPTION OF THE DRAWINGS

The various aspects of the present invention will now be described with reference to preferred embodiments shown in the drawings, wherein.

DETAILED DESCRIPTION OF THE VARIOUS ASPECTS OF THE PRESENT INVENTION

The various aspects of the present invention disclosed herein are considered particularly suitable for use in down-hole operations that take place within gas and oil wells. In particular the well plug of the present invention is considered particularly suitable for use in repair operations involving Open Hole Gravel Packs.

The term 'Open Hole Gravel Pack' (OHGP) is used throughout to indicate when a screen is used to hold back proppant/sand in a completion. It will be appreciated that, in practise, this covers all gravel pack completions including open hole, cased hole and frac packs.

Although the sealing and repair of Open Hole Gravel Pack is considered a particular suitable application of the present invention, it is envisioned that the various aspects of the present invention can also be employed in other well repair operations as well as in well abandonment.

Given the main focus of the present invention, the preferred embodiments will be described from this point of view. However, it is envisioned that the apparatus and methods described could be usefully applied in other technical fields, such as those fields where underground conduits are to be plugged (e.g. water pipes).

Figure 1:
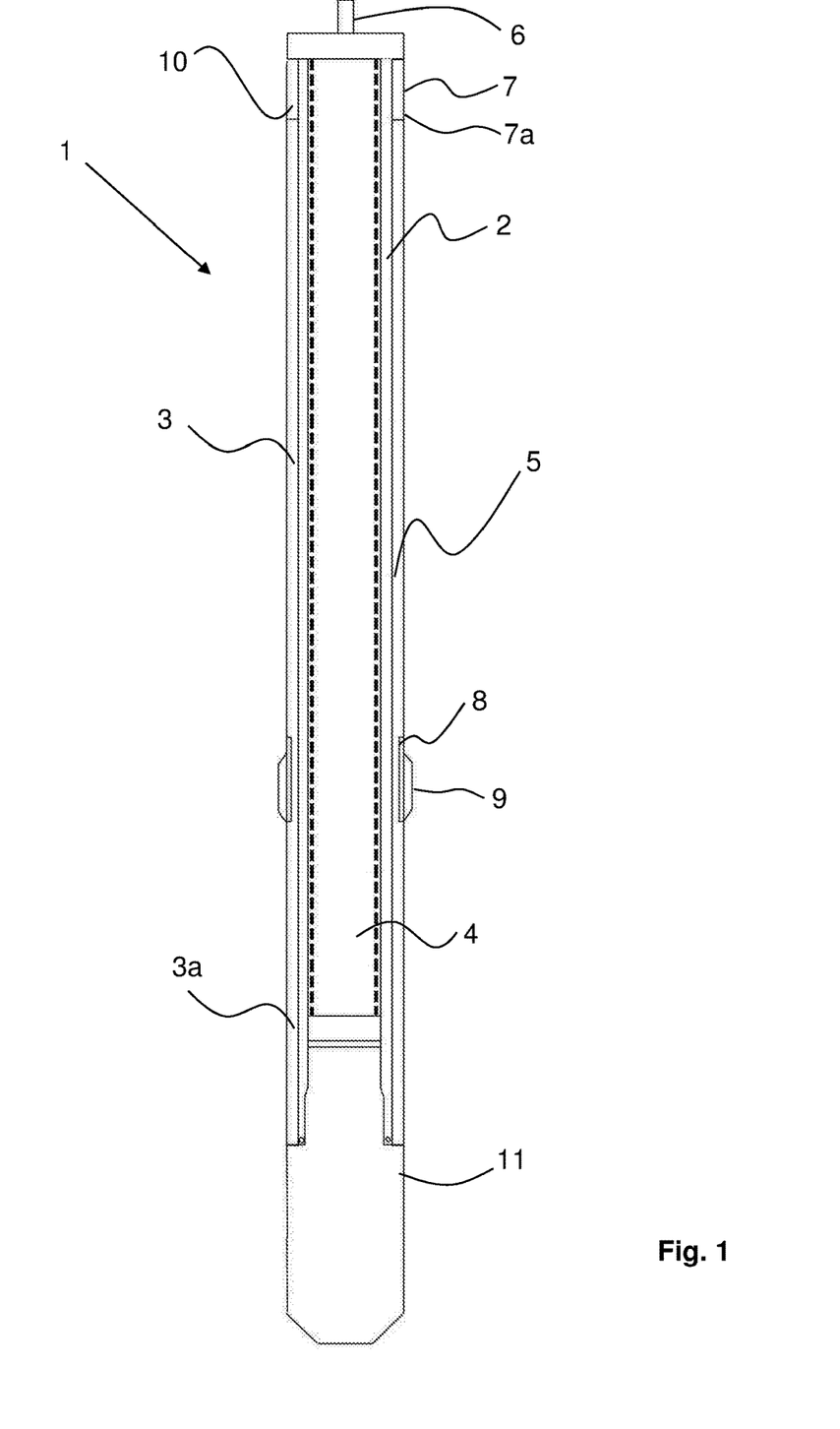
FIG. 1 shows a cross-sectional view of a well plugging/sealing tool for use in the method of the present invention.

FIG. 1 shows a well plugging/sealing tool 1 suitable for use in the methods of the present invention.

The well plugging/sealing tool 1 is formed from a centrally located heater body 2 made, for example, from steel, aluminium, stainless steel, carbon fibre, high temperature plastic. The heater body 2 is provided with a suitable eutectic/bismuth based alloy 3 along majority of its outside length.

Figure 2:
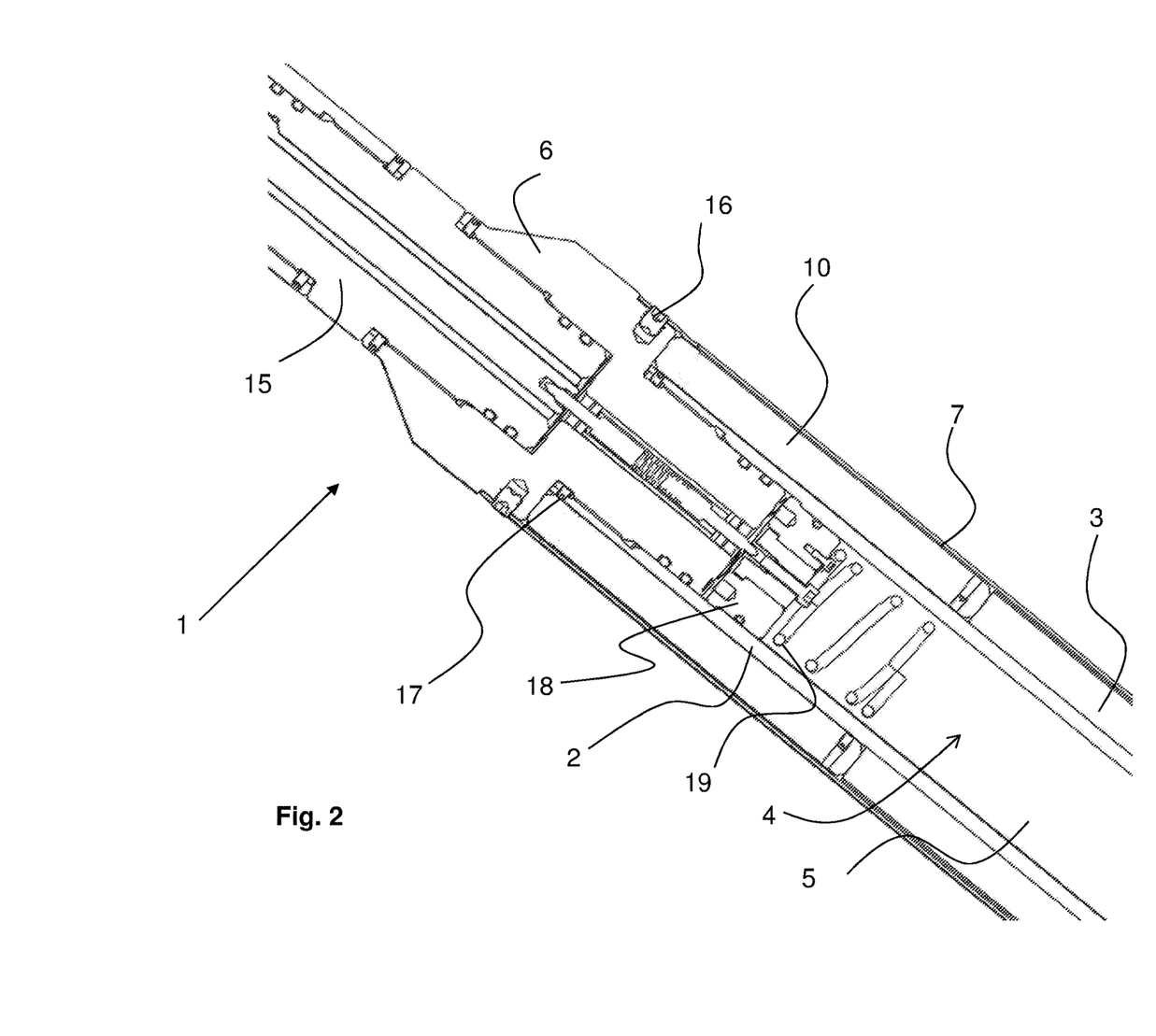
FIG. 2 shows a closer view of the well tool shown in FIG. 1.

The heater body 2 is also provided with a cavity 4 that, in use, receives a chemical heat source material, which may be a thermite mix in a powdered form, solid block form, fragmented block (i.e. crumble) form or a combination thereof. In order to simplify the drawings FIGS. 1 and 2 are shown without any chemical heat source material within the cavity.

The internal walls of the heater body 2 are protected by coating the inner walls of the heater body that define the cavity 4 with a lining of refractory material 5 (shown as dashed line for ease of identification).

Preferably the walls of the cavity are coated with zirconium oxide ($ZrO_2$), otherwise known as zirconium dioxide or zirconia. However alternatives refractory materials are envisaged, with suitable alternative including fibre glass, Kevlar® and other ceramic materials such as aluminium oxide and magnesium oxide.

It is also envisaged that the zirconium oxide may also be partially stabilized using dopants such as yttrium oxide, magnesium oxide, calcium oxide, and cerium (III) oxide.

In a preferred embodiment, the zirconium oxide coating is applied to the inner walls of the heater body 2 using a drip process. The drip process is considered preferable due to its economic efficiency. However it is envisaged that the coating may be applied using alternative approaches such as vapour deposition and spraying (including thermal spraying).

The heater body 2 and the alloy 3 are mounted to connection means 6 such that the tool 1 can be attached to a well deployment tool (not shown) for delivery down-hole. The tool and well deployment tool are shown in FIG. 2.

In the shown embodiment a sleeve 7 is provided on the outer surface of a majority (preferably at least ⅔ of the total length) of the well plugging/sealing tool 1. The sleeve 7 acts with the heater body 2 to almost completely envelop the alloy 3 with an annular space between the sleeve and the heater body 2.

As detailed above the sleeve 7 serves to protect the alloy 3. In the first instance the sleeve protects the alloy mechanically as the well plug travels down-hole to the target region. To achieve this, the sleeve is preferably made using a structurally strong and resilient material, such as thin steel or Kevlar® tubing. The mechanical protection is considered particularly necessary when the well plug assembly is being deployed in highly deviated wells (i.e. wells with not vertical orientations).

In the second instance the sleeve protects the alloy by insulating it from the down-hole environment. To achieve this, the sleeve is preferably made using a material with suitable insulating properties, such as fibre glass.

It is envisaged that while the sleeve does not necessarily need to provide mechanical protection, particularly in cases where the well path is more of a vertical nature, the insulating protection provided by the sleeve is considered to be essential in operations according to the methods of the present invention.

As detailed above, providing an insulating layer outside the alloy serves to not only retain heat within the well tool 1 for longer—thus giving more efficient heat generation—but it also counters the loss of heat that might occur to fluids flowing passed the well tool within the target region.

The well plugging/sealing tool 1 shown in FIG. 1 is provided with both a mechanically protective outer sleeve 7 (e.g. thin steel) and an insulating sleeve layer 7a (e.g. fibre glass). However it is envisaged that a composite material with suitable structural and heat retaining characteristic might be employed instead of the two layer sleeve arrangement.

As can be seen from FIG. 1, the sleeve 7 (and inner sleeve 7a) only extends along a portion of the full length of the well plugging/sealing tool 1. As a result a portion of the alloy and the heater are not shielded by the sleeve and is exposed. The exposed portion of the alloy is identified as 3a in the drawings.

As will be best appreciated from FIG. 1, the outer diameter of the exposed alloy region 3a is less than the outer diameter of the neighbouring regions of the tool 1. It will be appreciated that by setting the alloy in the exposed region 3a back from the skirt 11 (described later) and the sleeve 7 the exposed region, which is not shielded by the sleeve, is less likely to be damaged by bumps and collisions as the tool is run down the hole.

The partial coverage of the alloy 3 by the sleeve causes the covered alloy to become super-heated within the annular space between the heater and the sleeve because the alloy's only escape route is located at the point where the sleeve ends. It is envisaged that the positioning of the sleeve's end point can therefore be used to focus where the molten alloy is ejected into the surrounding well environment.

By ejecting super-heated molten alloy in this way, rather than releasing more slowly from along the entire length of the well plug, it is possible to get the alloy to travel much further before it cools and solidifies. This is considered particularly advantageous when forming seals in sand pack formations (i.e. OHGPs), because the alloy can penetrate much further into the sand pack before it finally sets—thus forming a better seal.

It is envisaged that although this arrangement is preferable, a similar focused deployment of molten alloy may be achieved by providing a sleeve that covers all of the alloy, but which is provided with weakened points that are configured to fail before the rest of the sleeve so as to form conduits through which the molten alloy can escape.

The well tool 1 shown in FIG. 1 is also provided with wear pads 9 that project out radially from the sleeve 7 of the well tool 1. The wear pads are preferably provided on a spacer 8 which has the main function of securing the heater body 2 to the sleeve 7, 7a.

In embodiments where the sleeve is more structurally substantial, and the heater body can be attached directly to the sleeve, the spacer 8 may not be required. In such embodiments the wear pads can be mounted onto the sleeve.

Although not essential, this provision of wear pads is preferable because it serves to further protect the well tool from damage during its deployment down-hole.

Although only a pair of wear pads 9 is shown in FIG. 1, it will be appreciated that the pads could be arranged periodically around the entire circumference of the outer surface of the well tool 1. It is also envisaged that multiple sets of wear pads could advantageously be positioned along the length of the well plug's outer surface.

Advantageously the annular space between the heater 2 and the sleeve is not entirely filed with alloy 3. Instead, and as will be appreciated from FIGS. 1 and 2 (not shown in FIG. 3), a spacer element 10 is provided in the annular space above the alloy 3.

The spacer element 10, which is preferably made from a structurally robust material such as steel, provides the well plug with a structurally reinforced region that can be more readily used by gripping machines to pick the well plug up during above-ground handling operations. It is envisaged that without the space element 10, a gripping machine would be more likely to crush the well plug due to the soft nature of eutectic/bismuth based alloys.

Finally, the well tool 1 is provided with a skirt 11 on its leading end. The skirt 11, which is essentially an open ended tube attached to the end of the heater body 2, allows well fluids to flow in and out of the open end thereby removing heat from the system and allowing the alloy to cool as it moves away from the heater body 2.

The above described features of the well plugging/sealing tool 1 will be further appreciated from FIG. 2, which show a more detailed view of the top end of the well plug together with part of a well deployment tool 15.

As can be seen, the well plugging/sealing tool 5 is connected to a well deployment tool 15 via connection means 6. The connection means 5 also serves to hold the heater body 2 and the sleeve 7 together by way of grub screws 16 (sleeve to connection means) and 17 (heater body to connection means).

Within the cavity 4 of the heater body is provided an ignition device 18, which is in operable communication with an operator at ground level via a linkage that passed through the connection means 6 and the well deployment tool 15.

In embodiments where the chemical heat source takes the form of thermite blocks, in particular a spring 19 is also located within the cavity 4. The spring 19, one end of which urges against the ignition device 18, is used to urge the blocks of the chemical heat source material housed in the cavity together so as to eliminate unwanted gaps between the blocks (not shown). Preferably the spring is provided with a washer (not shown) that increases the surface area pushing against the blocks.

The positioning of the spacer element 10 relative to the alloy 3 within the annular space provide between the heater body 2 and the sleeve 7 will be better appreciated from FIG. 2. In particular it will be noted that the spacer is located in a region that is not aligned with the heater cavity 4 into which the chemical heat source material is received. The alloy, however, is aligned with the heater cavity so as to ensure it is adequately heated.

Figure 3:
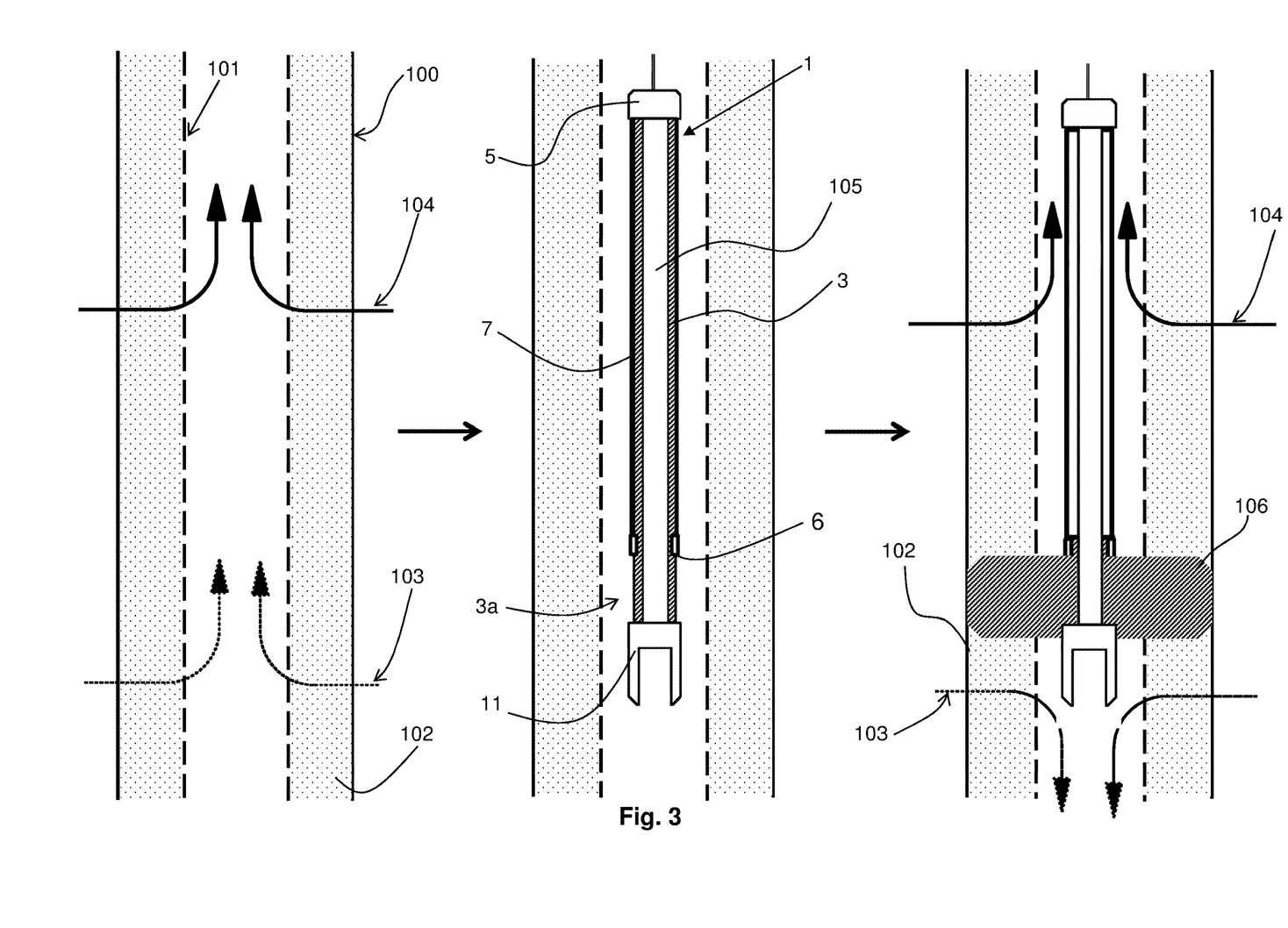
FIG. 3 is a diagrammatic representation of the key stages of an OHGP plugging operation.

Turning now to FIG. 3, the operation of the above described tool 1 in an Open Hole Gravel Pack (OHGP) will now be explained.

In the first stage an operating oil well with an OHGP is shown. An open hole 100 is formed in an underground formation so as to access an underground oil/gas reservoir.

The oil/gas is extracted from the reservoir via the production tubing 101, which in the region of the reservoir comprises a screen with a plurality of slots or apertures designed to allow the free flow of downhole fluids, including oil, into the tubing and ultimately out of the well.

In order to prevent the slots or apertures of the tubing 101 becoming blocked, a proppant 102 is provided between the tubing 101 and the surrounding formation 100.

In the past, in order to form a plug within an OHGP it would be necessary to first perforate the region in order to facilitate the setting of a cement plug. This is because the cement would otherwise not be able to flow through the slots or apertures of the tubing 101 and the surrounding proppant 102.

However, the present invention utilises the distinctive characteristics of eutectic/bismuth based alloys to form plugs in this environment without the need to carry out any perforation processes.

Returning to the first stage of FIG. 3, it can be seen that two different fluid streams are exiting the formation 100 and entering the production tubing 101. The first stream 103 represents a fluid with an acceptable proportion of oil to water. However the second stream 104 represents a fluid with a much higher proportion of water.

When the streams 103, 104 combine within the production tubing 101 they produce a combined fluid with a much less commercially acceptable oil to water ratio. In view of this it is highly advantageous to the economic viability of the well if the first fluid stream 103 can be isolated from the second fluid stream 104. Typically this would be achieved by using cement to plug the OHGP just above the source of the second fluid stream 104.

In accordance with the method of the present invention a eutectic/bismuth based alloy plugging tool 1 is deployed. This deployment is shown in the second key stage of FIG. 3. As the tool 1 is shown in use the central cavity 4 of the tool is provided with a chemical heat source 105.

Once in position above the source of the second, less desirable, fluid stream 104, the tool 1 can be activated by triggering the chemical heat source 105 with the heater body. This triggering step can be achieved by sending an activation signal down the same wireline that was used to run the tool into position.

The chemical heat source 105, which may preferably be in the form of a stack of thermite blocks, heats the alloy 3 that is arranged around the heater body. The sleeve 7, which surrounds and insulates the alloy 3, serves to keep the alloy in close proximity to the heater until it is able to escape at the point where the sleeve no longer covers the alloy and the heater.

This escape point, which essentially corresponds to the exposed portion of the alloy 3a, forms the location from which the molten alloy radiates outwards through the slots/apertures of the production tubing 101 and into the proppant 102.

By keeping the alloy 3 in close proximity to the chemical heat source 105 for longer the sleeve 7 causes the alloy to become 'superheated'. This 'superheated' alloy is then able to flow much further away from the heater before it cools enough to turn back into a solid.

Due to the characteristics of the eutectic/bismuth alloy used in the described tool, the molten alloy also expands as it solidifies, thereby forming an effective plug 106 within the region above the undesirable fluid stream 104.

As will be appreciated from the final key stage of FIG. 3, once the alloy plug 106 has been set the isolation of the first fluid stream 103 from the second fluid stream 104 is complete. As only the first fluid stream 103 can exit the well via the production tubing 101, the output of the well is once again returned to an acceptable oil/water ratio.

The above method demonstrates how a eutectic/bismuth based alloy plugging tool 1 can be used to isolate a non-oil producing region that is located further into a well than the oil producing regions. However it is envisaged that sometimes a non-oil producing region can occur between two oil producing regions.

If the above method were to be applied in such circumstances the setting of a plug would necessarily block off both a non-oil producing region and a potentially profitable oil producing region. The present invention therefore provides a further method of deploying a by-pass conduit (such as a straddle) using a similar approach to that described above.

Figure 4:
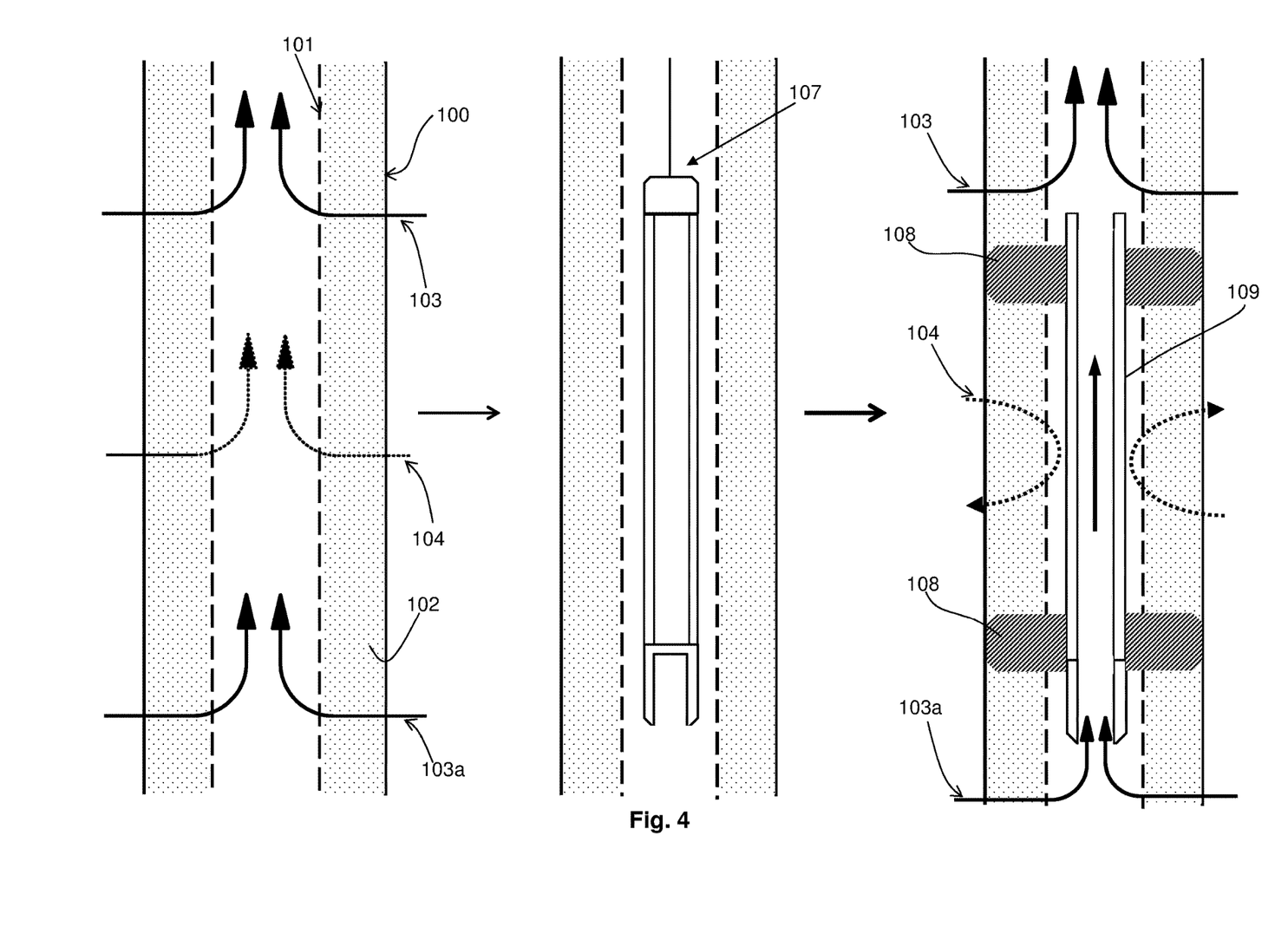
FIG. 4 is a diagrammatic representation of the key stages of an OHGP by-pass operation.

FIG. 4 provides a diagrammatic view of the key stages of deploying a by-pass conduit within an OHGP. As with FIG. 3, the first key stage of FIG. 4 shows three different fluid streams are exiting the formation 100 and entering the production tubing 101.

The first stream 103 and the third stream 103a represent a fluid with an acceptable proportion of oil to water. However the second stream 104 represents a fluid with a much higher proportion of water.

When the streams 103, 103a and 104 combine within the production tubing 101 they produce a combined fluid with a much less commercially acceptable oil to water ratio. In view of this it is highly advantageous to the economic viability of the well if the first fluid stream 103 and the third fluid stream can be isolated from the second fluid stream 104. However the positioning of the second fluid stream source between the first and third fluid stream sources makes it difficult to do this.

In order to isolate the non-oil producing fluid stream 104 from the other neighbouring oil producing streams 103 and 103a the present invention provides a method of deploying a by-pass conduit, preferably in the form of a straddle tool 107, within the production tubing 101.

Although the straddle tool is not shown in detail in FIG. 4, it should be understood that the straddle is essentially formed from a tubular member with the eutectic/bismuth based alloy plugging tool described hereinbefore provided on each of its ends. In the preferred embodiment the tubular member forms the heater body of both tools.

The arrangement of sleeves at the leading and trailing ends of the tubular member ensure that the 'superheated' alloy is expelled from the tool in a focused manner, as previously described, so as to ensure the formation of plugs 108 in the regions of the leading and trailing ends of the tubular member.

Once secured in position by the alloy plugs 108, the internal cavity of the heater bodies/tubular member can be cleared to provide a by-pass conduit 109 that extends from the region below the leading plug 108 to the region above the trailing plug 108.

As will be appreciated from the third stage of FIG. 4, the plugs hold the by-pass conduit 109 in position within the production tubing so that the third fluid stream 103a can flow out of the well via the production tubing 101. In addition, the plugs 106 isolate the source of the non-oil producing fluid stream 104 so that it does not dilute the other streams.

It will be appreciated that the tubular member may be of any length to suit the spacing of the oil producing and non-oil producing sources. It will be appreciated that the term 'non-oil producing' also includes sources that produce oil but at in a too diluted state that requires too much post extraction processing before it can be used. It is also envisaged that the tubular member may be provided with more than two eutectic/bismuth based alloy plugging tools.

The invention claimed is:

1. A method of sealing a region of a sand screen of an open hole gravel pack in a well without the need to form a plug in the well and without the need to perforate the sand screen, wherein the method comprises:

positioning a eutectic and/or bismuth based alloy at a target region in the well adjacent the sand screen, wherein the positioning is done without a need to form a plug in the well;

heating the alloy within an annulus having an insulating sleeve and an opening so that the alloy melts and flowing the alloy out of the opening and through the sand screen wherein the melting and flowing is done without the need of a plug in the well; and, allowing the alloy to cool and form a seal.

2. The method of claim 1, wherein the eutectic and/or bismuth based alloy is delivered to a target region using a eutectic and/or bismuth based alloy well plugging and/or sealing tool, said tool comprising:

a tubular heater body with an internal cavity capable of receiving a chemical heat source;

a quantity of eutectic and/or bismuth based alloy provided in thermal communication with the heater body around an outer surface of the heater body;

wherein the insulating sleeve is provided around an outer surface of the alloy; and wherein the sleeve is configured to provide a focused egress for the alloy as it is melted by the chemical heat source.

3. A method of deploying a by-pass conduit adjacent a sand screen within an open hole gravel pack in a well, said method comprising:

deploying a well plugging and/or sealing tool that comprises:

a tubular heater body with an internal cavity capable of receiving a chemical heat source;

a quantity of eutectic and/or bismuth based alloy provided in thermal communication with the heater body around an outer surface of the heater body;

an insulating sleeve provided around an outer surface of the alloy; and wherein the sleeve is configured to provide a focused egress for the alloy as it is melted by the chemical heat source;

operating the tool to melt the alloy, flowing the molten alloy through the adjacent sand screen and thereby forming a seal that extends into the adjacent sand screen;

removing the chemical heat source from the cavity of the tubular heater body such that the tubular heater body can serve as a by-pass conduit.

4. A method of sealing a region of a sand screen of an open hole gravel pack, the method comprising:

(a) deploying a eutectic and/or bismuth based alloy well plugging and/or sealing tool to a region of a sand screen of an open hole gravel pack without the need to perforate the sand screen, said tool comprising:

(i) a tubular heater body with an internal cavity receiving a chemical heat source;

(ii) a quantity of eutectic and/or bismuth based alloy provided in thermal communication with the heater body around an outer surface of the heater body;

(iii) an insulating sleeve provided around an outer surface of the alloy; and wherein the sleeve is configured to provide a focused egress for the alloy as it is melted by the chemical heat source;

(b) initiating the chemical heat source to melt the alloy; and, (c) flowing the molten alloy in a focused egress through the sand screen and into the formation.

5. The method of claim 4, wherein the deployed alloy forms a seal within the region of the sand screen.

6. The method of claim 4, wherein the sleeve does not extend the full length of the heater body and/or the alloy.

7. The methods of claim 4, 5 or 6, wherein the sleeve is provided with one or more weakened regions that perish before the main body of the sleeve and provide clearly defined conduits for the molten alloy to escape.

8. The methods of any of claims 4 to 6, wherein the tubular heater body, the alloy and the sleeve are arranged co-axially to one another.

9. The methods of any of claims 4 to 6, wherein the tubular heater body and the sleeve define an annular space within which at least a portion of the alloy is enclosed.

10. The method of claim 9, wherein the annular space further contains a spacer element with a greater structural strength than the alloy.

11. The method of any of claims 3 to 6, wherein the sleeve is formed from one or more of the following: fibre glass, steel, carbon fibre, synthetic fibre, and poly(p-phenylene terephthalamide).

12. A straddle tool, said straddle tool comprises a length of conduit, that has a well plugging and/or sealing tool located at both of its leading end and its trailing end and wherein each well plugging and/or sealing tool comprises:

a tubular heater body with an internal cavity capable of receiving a chemical heat source;

a quantity of eutectic and/or bismuth based alloy provided in thermal communication with the heater body around an outer surface of the heater body;

an insulating sleeve provided around an outer surface of the alloy; and wherein the sleeve is configured to provide a focused egress for the alloy from both ends of the conduit as the alloy is melted by the chemical heat source.

13. The straddle tool of claim 12, wherein the conduit forms the tubular heater bodies of the well plugging and/or sealing tools.

14. The straddle tool of claim 12 or 13, further comprising one or more additional well plugging and/or sealing tools located between the ends of the conduit.

15. The straddle tool of claim 12, wherein the conduit is a pipe.

* * * * *